United States Patent [19]

Tucker et al.

[11] Patent Number: 5,456,840
[45] Date of Patent: * Oct. 10, 1995

[54] METHOD FOR REMOVING ANIONS FROM WATER

[75] Inventors: Edwin E. Tucker; Sherril D. Christian; John F. Scamehorn, all of Norman, Okla.

[73] Assignee: The Board of Regents of the University of Oklahoma, Norman, Okla.

[*] Notice: The portion of the term of this patent subsequent to Apr. 12, 2011 has been disclaimed.

[21] Appl. No.: 194,537

[22] Filed: Feb. 10, 1994

Related U.S. Application Data

[63] Continuation-in-part of Ser. No. 24,705, Mar. 1, 1993, Pat. No. 5,302,290.

[51] Int. Cl.[6] .................................................. B01D 61/16
[52] U.S. Cl. ................................................ 210/638; 210/651
[58] Field of Search ................................ 210/638, 639, 210/651, 913

[56] References Cited

U.S. PATENT DOCUMENTS

| 4,089,778 | 5/1978 | Gauger | 210/639 X |
| 5,302,290 | 4/1994 | Tucker et al. | 210/638 |

Primary Examiner—Frank Spear
Attorney, Agent, or Firm—Dunlap Codding

[57] ABSTRACT

A method for removing anions from water is provided. A complexing agent, such as a cationic polyelectrolyte, is added to untreated water. The cationic polyelectrolyte complexes with anions, such as chromate, and the complex if filtered out of the water. The complex is then treated with a regeneration agent, such as barium chloride or lead chloride to precipitate ions and to regenerate the complexing agent. The regenerated complexing agent can be reused for water treatment.

41 Claims, 2 Drawing Sheets

FIG. 4 ns from water.

METHOD FOR REMOVING ANIONS FROM WATER

This application is a continuation-in-part of U.S. Ser. No. 08/024,705, entitled "METHOD FOR REMOVING TOXIC ANIONS FROM WATER", filed Mar. 1, 1993, now U.S. Pat. No. 5,302,290.

FIELD OF THE INVENTION

The present invention generally relates to methods for purifying water and more specifically to a method for removing anions from water.

DESCRIPTION OF THE PREFERRED EMBODIMENTS

The present invention comprises a method for removing anions from water. Unlike conventional methods for removing anions, such as chromate and arsenate, from aqueous streams, the present invention does not rely on the addition of large quantities of acid and base (large relative to the volume of water to be treated).

Conventional processes for removing chromate, for example, require addition of large quantities of acid and reducing agent and, subsequently, large quantities of base to precipitate hydrous oxides indiscriminately. The treated water thus contains a large quantity of salt. The present invention is selective for anions, preferably with a charge of −2 or greater, and works well at pH values which are near 7.0. The process requires only about a stoichiometric addition of chemicals to the aqueous stream. Consequently, the ionic concentration of the purified water produced is approximately the same as that of the untreated aqueous stream. Therefore, the potability of the water is not degraded by the process of treatment.

A cationic complexing agent, such as, for example, a cationic polyelectrolyte (also called herein "the polymer"), is added to water containing a target anion. The cationic complexing agent forms a retention complex with at least a portion of the target anions contained in the water. The water is then passed through an appropriately sized filter, such as an ultrafiltration membrane, with a filter pore size small enough to retain the retention complex.

The retention complex is thereby retained in a small fraction of the water, called herein "the retentate" or "the retention complex stream". Most of the water (the purified water) is passed with a substantially lower target anion concentration. The purified water is known herein as "permeate" or "the purified aqueous stream."

The retentate is then treated with a regeneration agent to separate at least a portion of cationic complexing agent for reuse in the process. The ultrafiltration process may be referred to herein as polyelectrolyte-enhanced ultrafiltration or PEUF. In a preferred embodiment, the cationic complexing agent comprises poly (dimethyldiallylammonium chloride) or PDMDAAC.

The ultrafilter preferably comprises a hollow fiber or spiral wound membrane cartridge, such as the Harp polysulfone membrane hollow fiber cartridge with a 2 sq. ft. area and a 10K molecular weight cutoff.

REMOVAL OF CHROMATE

Figure 1:
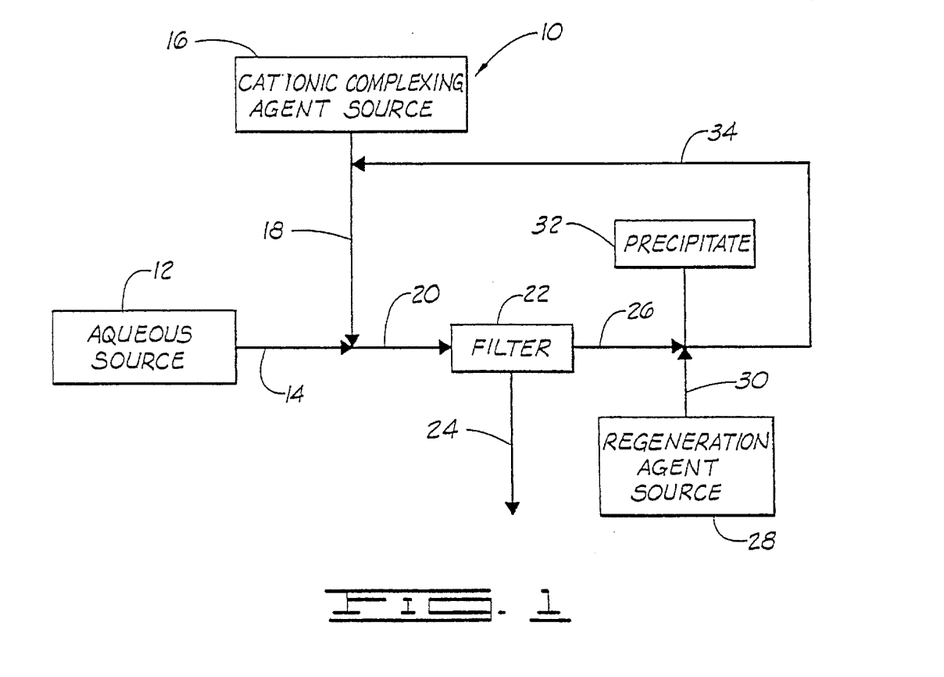
FIG. 1 is a diagrammatic view of the method of the present invention.

The method of the present invention is shown in FIG. 1, the invention being identified generally by the numeral 10. An aqueous source 12 containing a plurality of target anions (anions sought to be removed from the aqueous source) is passed in an aqueous stream 14. In this embodiment, the target anion is chromate. Removal of chromate generally illustrates the method of the invention.

A cationic complexing agent (preferably a cationic polyelectrolyte, such as polydimethyldiallylammonium chloride) from a cationic complexing agent source 16 is passed in a first cationic complexing agent stream 18. The cationic complexing agent reacts with at least some of the toxic anions contained in the aqueous stream 14 to form a retention complex in a treated aqueous stream 20.

The treated aqueous stream 20 is passed through a filter 22. A permeate or purified aqueous stream 24 which is substantially free of target anions is produced. The target anions substantially have combined with the cationic complexing agent to form the retention complex. The retention complex is retained substantially in the filter 22. The retention complex is flushed from the filter 22 in a retentate or retention complex stream 26. The stream 26 contains part of the water volume originating in the untreated aqueous stream 14.

A regeneration agent from a regeneration agent source 28 is passed in a regeneration agent stream 30 to mix with the retention complex stream 26. The regeneration agent can consist essentially of barium chloride or lead chloride. The regeneration agent can also consist of metallic iron, zinc, or aluminum, generally in the form of wool, sheets, pellets, chips or powder. For low concentrations of chromate, for example, 0.1 ppm, metallic iron, zinc or aluminum are preferred regeneration agents.

When barium or lead chloride is added to the concentrated polymer/chromate complex (the retention complex) after the step of ultrafiltration, the positively charged barium or lead ions combine with negatively charged chromate ions. Insoluble precipitates of barium chromate or lead chromate are formed.

Chloride ions from the barium or lead chloride, and other ions naturally found in the retentate, combine with the polymer in the polymer/chromate complex to reconstitute the original polymer. A substantial portion of the chromate is separated as a solid material and a substantial portion of the polymer is recycled for further use.

Metallic iron, zinc, or aluminum can also be added to the polymer/chromate complex after the step of ultrafiltration. Metallic iron, zinc and aluminum reduce chromium from the +6 oxidation state to the +3 oxidation state. In the +6 oxidation state, chromium ordinarily is a constituent of the negatively-charged chromate ion, $CrO_4^{2-}$. The applicants believe that by reducing chromium with metallic iron or zinc, the oxidation state of chromium is converted from +6 to +3. In the +3 state the positively charged chromium ion separates from the positively charged polyelectrolyte.

The +3 chromium ions may remain in solution, but the applicants believe that hydroxide ion is produced by the reaction of iron, zinc or aluminum metal with chromium in the +6 state. Chromium in the +3 state (as a constituent of the salt produced) will thereby precipitate naturally. However, to assist precipitation, an amount of base (small relative to the amount of water to be treated) can be added to the regeneration agent stream 26 after the metallic iron, zinc or aluminum has had time to react with the retention complex.

At least a portion of the regeneration agent (if the regeneration agent comprises barium chloride or lead chloride) reacts with the cationic complexing agent contained in the retention complex, resulting in a regenerated cationic complexing agent. A portion of the regeneration agent also reacts with at least a portion of target cations contained in the retention complex, resulting in a precipitate 32.

If the regeneration agent consists of metallic iron, zinc, or aluminum, a base, such as sodium hydroxide, can be added to the retention complex stream 26 in order to assist in forming a precipitate 32. The addition of a base will enhance precipitation in some circumstances, but it is not necessary for the operation of the invention.

When the regeneration agent consists of a metal, the cationic complexing agent picks up appropriate counter ions (such as chloride naturally occurring in the aqueous stream 14), after the chromate is stripped off by reduction. The cationic complexing agent is thereby regenerated. The regenerated cationic complexing agent is passed in a second cationic complexing agent stream 34.

If the aqueous source 12 contains a high concentration of sulfate ion (a sulfate concentration generally in excess of 100 ppm), the aqueous source 12 may initially be treated by the addition of a precipitating agent, such as barium chloride or lead chloride, as will be explained below. The precipitating agent acts to precipitate at least a portion of the sulfate ion contained in the aqueous source 12. The addition of a precipitating agent will enhance the efficiency of anion removal in some circumstances, but is not required for the operation of the present invention.

The second cationic complexing agent stream 34 in a preferred embodiment is combined with the first cationic complexing agent stream 18 for use in treating additional quantities of the aqueous stream 14.

Figure 2:
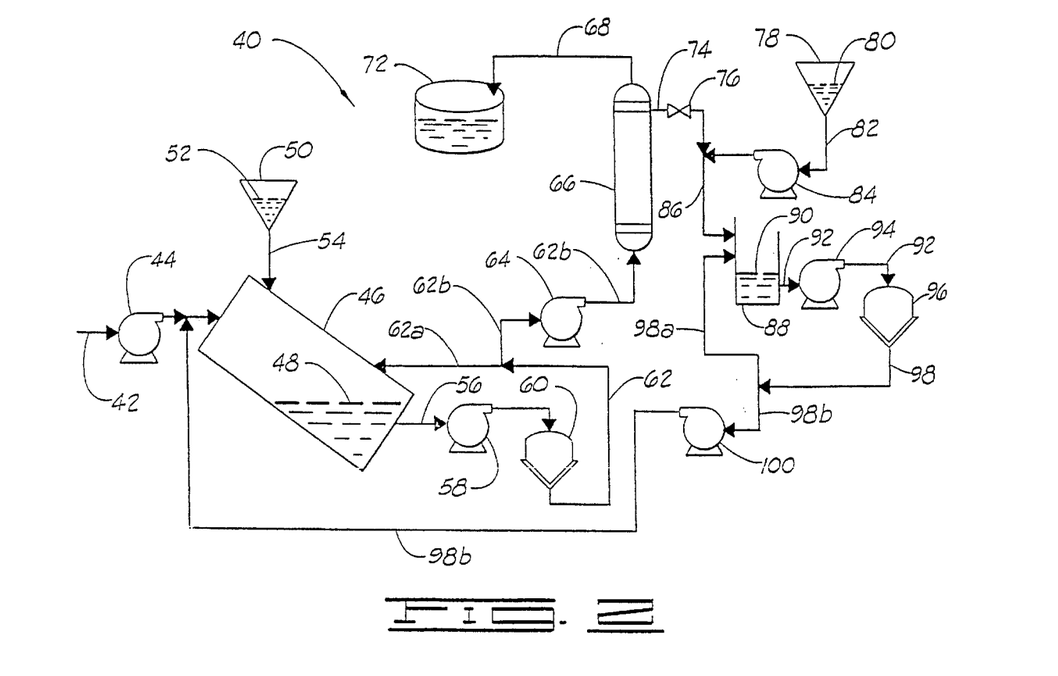
FIG. 2 is a schematic, diagrammatic view of an apparatus constructed to carry out the method of the present invention.

Schematically and diagrammatically shown in FIG. 2, is an apparatus 40 constructed to carry out the method of the present invention. In this embodiment of the invention, barium chloride is used to regenerate PDMDAAC after the PDMDAAC has formed a complex with at least a portion of the chromate.

Ground water containing chromate is fed into the apparatus 40 via a ground water feed 42. The rate of ground water feed is governed by a first metering pump 44. The ground water is fed into a feed reservoir 46, where the ground water is mixed with a polymer 52 fed by gravity into the feed reservoir 46 from a polymer reservoir 50 via a polymer feed 54. Additional polymer can be added to the feed reservoir 46 via a polymer/barium chloride feed 98b, as will be explained below. The polymer 50 reacts with the chromate contained in the feed water, resulting in a polymer treated water 48.

The polymer treated water 48 passes via treated water feed 56 to a first circulation pump 58 and thereafter to a first cartridge filter 60. After leaving the first cartridge filter 60, the treated water feed 56 is divided into a treated water feed 62a and a treated water feed 62b. The treated water in the treated water feed 62a returns to the feed reservoir 46, whereas treated water in treated water feed 62b passes to a DC controlled gear pump 64.

The DC controlled gear pump 64 controls the rate of flow of treated water, via treated water feed 62b, into an ultrafilter 66. The ultrafilter 66 retains a portion of chromate that has combined with the polymer 52, and has formed thereby a retention complex or retentate. Purified water, which is substantially free of chromate, passes via purified water feed 68 to a purified water reservoir 72. The retentate passes via retentate feed 74 to a restriction valve 76, which controls the rate of flow of the retentate.

After passing through the restriction valve 76, the retentate in retentate feed 74 mixes with aqueous barium chloride 80 contained in a barium chloride reservoir 78. The aqueous barium chloride 80 passes via a barium chloride feed 82 through a second metering pump 84, which controls the rate of flow of aqueous barium chloride 80. The second metering pump 84 is connected to the retentate feed 74 by the barium chloride feed 82. The retentate feed 74 and the barium chloride feed 82 combine to form a retentate/barium chloride feed 86 which feeds into a receiving tank 88.

The receiving tank 88 contains a solution of barium chloride, rejuvenated polymer, and toxic precipitant formed by the reaction of barium chloride with the retentate. The resulting liquid and toxic precipitant 90, via a liquid and particulate feed 92, passes to a third circulation pump 94. Thereafter the precipitant 90 passes to a second cartridge filter 96, where the toxic precipitant is removed.

The resulting polymer/barium chloride solution passes via polymer/barium chloride feed 98, which splits into a polymer/barium chloride feed 98a and a polymer/barium chloride feed 98b. The polymer/barium chloride feed 98a returns to the receiving tank 88. The polymer/barium chloride feed 98b goes to a second metering pump 100, which controls the rate of flow of polymer/barium chloride in the polymer/barium chloride feed 98b.

The polymer/barium chloride solution is fed from the second metering pump 100 via polymer/barium chloride feed 98b to the ground water feed 42. Polymer/barium chloride solution may be introduced into the ground water feed 42, to provide additional treatment for the ground water.

It will be appreciated that the circulation of liquids through this apparatus is controlled by the first metering pump 44, the DC controlled gear pump 64, the restriction valve 76, the second metering pump 84, and the third metering pump 100. The flow of liquids is controlled to provide the optimum reactive conditions for the polymer, the feed water, the retentate, and the barium chloride.

For example, ground water to be treated can contain, in addition to chromate, a high concentration of sulfate, which interferes with the formation of the chromate/polymer retention complex. Sulfate can be precipitated as barium sulfate by the addition of barium. Therefore, excess aqueous barium chloride 80 (an amount of barium chloride beyond that needed to regenerate the polymer portion of the retention complex contained in the retentate and to form the barium chromate precipitate) from the barium chloride reservoir 78 can be added to the retentate/barium chloride feed 86. This creates an excess of barium chloride in the receiving tank 88.

A portion of the excess barium chloride is introduced into the feed reservoir 46 via polymer/barium chloride feed 98b and ground water feed 42. The barium chloride and at least a portion of the sulfate contained in the ground water of the feed reservoir 46 form a barium sulfate precipitate. The precipitate is removed from the polymer treated water by the first cartridge filter 60. Lead chloride can be used in the apparatus 40 in the same manner as barium chloride.

If metallic iron, zinc, or aluminum is used as the regeneration agent, the reservoir 78, the feed 82 and the second metering pump 84 are not used. For example, metallic iron or zinc (generally in the form of filings) can be added directly to the receiving tank 88. Alternately, a column (not shown), containing metallic iron, zinc, or aluminum (generally in the form of wool, sheets, powder or chips) can be inserted in the feed 86.

The reaction of the metal with the chromate may not produce sufficient hydroxide ion to precipitate the chromium and metallic cations formed. A base, such as sodium hydroxide, can then be added to the receiving tank 88, to precipitate chromium +3 ions that have been reduced. The precipitate formed is then filtered out of solution by the second cartridge filter 96.

TABLE I

UF Data for 0.0015M PDMDAAC/0.00005M Chromate

| Feed (M) $CrO_4^{2-}$ | Ret. (M) $CrO_4^{2-}$ | Perm (M) $CrO_4^{2-}$ | Flow gms/min | Recov. % | Reject % | P in psi |
|---|---|---|---|---|---|---|
| 5.13e-5 | 8.59e-5 | 9.78e-8 | 768.6 | 41.0 | 99.8 | 30.5 |
| 5.08e-5 | 9.84e-5 | 1.09e-7 | 639.9 | 49.2 | 99.8 | 30.1 |
| 4.99e-5 | 1.26e-4 | 1.80e-7 | 499.7 | 61.1 | 99.6 | 30.2 |
| 4.85e-5 | 2.02e-4 | 4.38e-7 | 373.7 | 77.6 | 99.1 | 30.4 |
| 3.66e-5 | 3.95e-4 | 3.60e-6 | 261.3 | 90.4 | 90.2 | 30.5 |
| 2.82e-5 | 4.03e-4 | 4.06e-6 | 285.2 | 95.5 | 85.6 | 35.8 |
| 2.09e-5 | 4.00e-4 | 4.16e-6 | 295.6 | 96.6 | 80.0 | 40.1 |

Feed (M) is the molarity of chromate in the UF feed solution.
Ret (M) is the molarity of chromate in the UF retentate solution.
Perm (M) is the molarity of chromate in the UF permeate solution.
Flow is the total amount of (feed) solution passing through the column per minute.
Recov. % is the percent of total flow appearing as permeate liquid.
Reject. % is 100(1-[Perm]/[Feed] and is the % chromate removed from the permeate.
P (in) is the applied (gage) pumping pressure at the UF column entrance.

Table 1 shows ultrafiltration data for a feed solution at pH near 7.0 (the untreated aqueous stream) containing 0.0015M polymer (PDMAAC) and 0.00005M chromate. Up to 96% of the feed solution is passed as purified water with a balance (as retentate) containing the retention complex.

The quality of the separation becomes substantially poorer as percentage water recovery goes above 90%. At this point, the retentate volume is only 10% of the feed solution volume. In other words, the polymer and chromate have been separated into a retention complex stream only 1/10 the size of the untreated aqueous stream.

The only electrolyte change in the water produced is that the original (chloride) counter ion to the polymer has been partially replaced by chromate. The polymer has been used to concentrate the target anion into a smaller volume.

Figure 3:
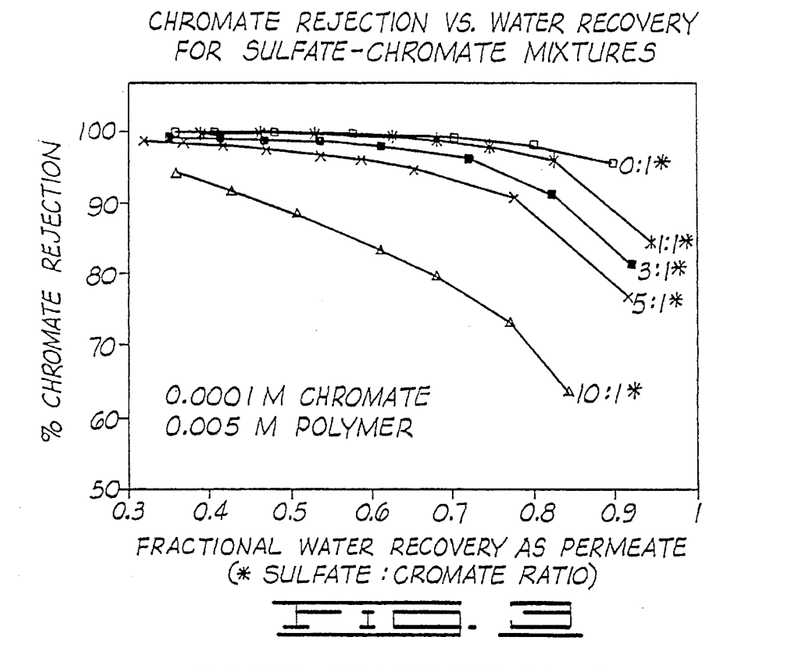
FIG. 3 is a graphic representation of the results of certain experiments relating to chromate rejection versus water recovery for sulfate-chromate mixtures.

FIG. 3 shows results from a series of ultrafiltration experiments at a concentration of 0.005M polymer and 0.0001M chromate with an increasing background concentration of sulphate. At sulphate:chromate ratios no larger than 5:1, the chromate rejection is as high as 95% with a water recovery of 0.8. However, large amounts of sulphate interfere with removal of the target anion by competing for bonding sites on the polymer. Sulfate concentration can be lowered by pre-treating the feed solution with barium chloride in order to precipitate at least part of the sulfate out of the feed solution.

At one site, ground water contained an inorganic solids concentration of approximately 500 ppm. The inorganic solids consisted essentially of sodium, calcium, and magnesium (cations) and chloride and sulphate (anions). The sulphate concentration ranged from 80–100 ppm. The chromate concentration ranged from 0.1 ppm–7 ppm in samples from several monitoring wells. Table 2 (below) shows PEUF data for one sample with a chromate level of approximately 7 ppm and a sulphate level of 88 ppm.

TABLE II

UF Data for Ground Water (7 ppm Chromate; 88 ppm sulfate)

| Feed (M) $CrO_4^{2-}$ | Ret. (M) $CrO_4^{2-}$ | Perm (M) $CrO_4^{2-}$ | Flow gms/min | Recov. % | Reject % | P in psi |
|---|---|---|---|---|---|---|
| 1.27e-4 | 2.00e-4 | 7.69e-6 | 633.6 | 38.2 | 93.9 | 30.9 |
| 1.24e-4 | 2.57e-4 | 1.03e-5 | 383.8 | 54.4 | 91.7 | 31.4 |
| 1.21e-4 | 3.77e-4 | 1.27e-5 | 238.6 | 70.3 | 89.4 | 30.4 |
| 1.09e-4 | 6.58e-4 | 1.95e-5 | 145.2 | 87.4 | 82.2 | 30.9 |
| 1.15e-4 | 5.33e-4 | 1.80e-5 | 186.7 | 82.3 | 84.3 | 35.5 |
| 1.09e-4 | 6.42e-4 | 2.09e-5 | 179.5 | 86.5 | 80.8 | 41.2 |

The ground water sample (with a pH of approximately 6.5) was not pre-treated in any way. A small volume of polymer was added and the solution run through the apparatus 40 as explained above. Three separate experiments with polymer concentrations of 0.005, 0.01 and 0.025M, respectively, were performed with a sample of the ground water; however the data in Table 2 are for the 0.01M added polymer concentration. As shown, chromate rejection is above 80% at all water recovery values for this particular water sample, the water sample containing a substantial level of electrolytes.

TABLE III

UF Data for Ground Water (ca. 0.2 ppm chromate-sulfate reduced)

| Feed (M) $[CrO_4^{2-}]$ | Ret. (M) $[CrO_4^{2-}]$ | Perm (M) $[CrO_4^{2-}]$ | Flow g/min | Recov. % | Reject % | Input P psi |
|---|---|---|---|---|---|---|
| 4.31e-6 | 8.51e-6 | 5.00e-7 | 514.2 | 52.5 | 88.4 | 36.2 |
| 4.32e-6 | 9.03e-6 | 5.32e-7 | 476.6 | 55.2 | 87.7 | 36.3 |
| 4.30e-6 | 9.83e-6 | 5.30e-7 | 423.8 | 59.2 | 87.7 | 36.1 |
| 4.28e-6 | 1.08e-5 | 5.88e-7 | 369.8 | 63.6 | 86.3 | 36.2 |
| 4.24e-6 | 1.20e-5 | 6.38e-7 | 321.4 | 68.7 | 85.0 | 36.3 |
| 4.13e-6 | 1.71e-5 | 8.00e-7 | 238.2 | 80.0 | 80.6 | 36.9 |

Another ground water sample was tested in which the sulphate:chromate ratio was unfavorable at 90 ppm sulphate to 0.2 ppm chromate. The test results are shown in Table 3, above. The ratio of sulphate to chromate was 450:1 in this sample and therefore the sample was treated with a small quantity of barium chloride to precipitate a quantity of the sulphate before doing the UF experiment. As shown in Table 3, chromate was removed to less than 42 ppb (0.0000008M).

Figure 4:
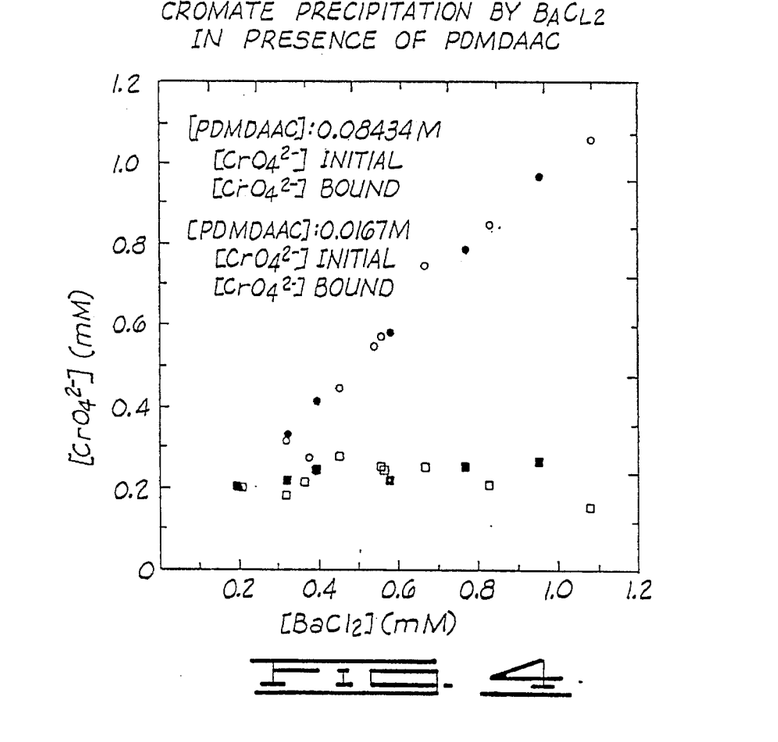
FIG. 4 is a graphic representation of the results of certain experiments relating to chromate precipitation by barium chloride in the presence of poly dimethyldiallylammonium chloride.

The separation of polymer from chromate contained in the retention complex was also tested. One set of experiments, as shown in FIG. 4, consisted of equilibrating various mixtures of polyelectrolyte, sodium-chromate and barium chloride. The polyelectrolyte concentration in nine separate experiments varied from 0.001M to 0.12M. At each specific polyelectrolyte concentration, approximately equimolar concentrations of barium chloride and sodium chromate were added up to a maximum of approximately 0.001M.

The upper points in FIG. 4 represent the total amount of chromate present in the test solutions. After equilibration, the test solutions were filtered to remove precipitate and then the permeate was analyzed for residual chromate. The graph shows two particular data sets of this type for PDMDAAC concentrations of 0.0167M and 0.0843M. The conversions of the lines indicate the point at which little barium chromate will be precipitated in the polyelectrolyte-barium chloride-sodium chromate mixture.

The lower set of points show the residual chromate concentration in the solution. The vertical difference between the two lines in FIG. 4 is the measure of the amount of chromate precipitated as the barium salt ($BaCrO_4$). Much of the chromate in the polymer solution can be precipitated as barium chromate. A significant amount of chromate remains in the solution due to the strong interaction of chromate with the cationic PDMDAAC.

In this experiment, no more than a stoichiometric amount of barium chloride was used to precipitate sodium chromate. Excess barium chloride could be used to remove more chromate. Excess barium ion resulting from this process may be naturally removed by making use of the fact that natural waters will, in general, have an appreciable level of sulphate (as did the ground water samples tested above).

Sulphate will have the effect of taking up excess barium ion. Therefore, excess barium chloride can be added to the retentate to precipitate chromate. When the polymer from the retentate is recycled (carrying the excess barium) to mix with the incoming feed stream (high in sulphate) both barium and sulphate will be removed from the feed source.

This has the effect of improving the UF process in two ways. Excess sulphate is removed from the feed stream. Excess barium (which aids in improved chromate precipitation and retentate) is removed before it can appear in the permeate water.

REMOVAL OF ARSENATE

According to the method of the present invention, arsenate ($AsO_4^{3-}$), and other anionic compounds of arsenic, can also be removed from water. The method for removing arsenate is generally the same as that illustrated in FIG. 1 for the removal of chromate. Arsenate removal can be accomplished using the apparatus 40 shown in FIG. 2.

However the regeneration agent from the regeneration agent source 28 (FIG. 1), can additionally consist of salts of aluminum or ferric iron ($AlCl_2$ and $FeCl_3$, respectively). In using the apparatus 40 (FIG. 2), the aluminum or ferric salt is hydrated and placed in the reservoir 78. The salt replaces barium chloride in the reservoir 78.

Shown below are ultrafiltration data for sodium arsenate and sodium sulfate solutions. As shown in the data, sulfate competes with arsenate for the binding sites on the cationic polymer.

Chart 1
Ultrafiltration data for sodium arsenate/sodium sulfate solutions with cationic polymer

| Feed (M) $AsO_4^{3-}$ | Ret. (M) $AsO_4^{3-}$ | Perm (M) $AsO_4^{3-}$ | Flow gms/min | Recov. % | Reject. % | $Na_2SO_4$ (M) |
|---|---|---|---|---|---|---|
| 1.26e-4 | 2.5e-4 | 2.0e-8 | 624.7 | 49.9 | 99.98 | 0 |
| 1.26e-4 | 2.8e-4 | 2.6e-8 | 560.6 | 55.5 | 99.98 | 0 |
| 1.24e-4 | 3.4e-4 | 4.9e-8 | 436.7 | 63.6 | 99.96 | 0 |
| 1.15e-4 | 6.3e-4 | 8.8e-8 | 311.7 | 81.9 | 99.92 | 0 |
| 9.80e-5 | 1.9e-4 | 2.4e-7 | 861.0 | 47.7 | 99.8 | 1e-4 |
| 9.37e-5 | 2.5e-4 | 2.0e-7 | 604.9 | 61.4 | 99.8 | 1e-4 |

-continued

Chart 1
Ultrafiltration data for sodium arsenate/sodium sulfate solutions with cationic polymer

| Feed (M) $AsO_4^{3-}$ | Ret. (M) $AsO_4^{3-}$ | Perm (M) $AsO_4^{3-}$ | Flow gms/min | Recov. % | Reject. % | $Na_2SO_4$ (M) |
|---|---|---|---|---|---|---|
| 9.02e-5 | 2.8e-4 | 2.4e-7 | 532.7 | 67.4 | 99.7 | 1e-4 |
| 9.32e-5 | 3.4e-4 | 3.0e-7 | 454.3 | 74.9 | 99.7 | 1e-4 |
| 8.95e-5 | 4.6e-4 | 3.2e-7 | 417.4 | 81.0 | 99.6 | 1e-4 |
| 9.38e-5 | 5.2e-4 | 3.7e-7 | 366.6 | 84.6 | 99.6 | 1e-4 |
| 9.46e-5 | 1.8e-4 | 3.9e-7 | 804.6 | 48.5 | 99.6 | 3e-4 |
| 9.69e-5 | 2.2e-4 | 4.0e-7 | 621.5 | 59.0 | 99.6 | 3e-4 |
| 9.33e-5 | 2.6e-4 | 4.7e-7 | 512.2 | 66.3 | 99.5 | 3e-4 |
| 9.70e-5 | 3.3e-4 | 5.7e-7 | 415.5 | 75.2 | 99.4 | 3e-4 |
| 9.27e-5 | 3.7e-4 | 6.1e-7 | 386.5 | 78.7 | 99.3 | 3e-4 |
| 9.28e-5 | 4.9e-4 | 7.1e-7 | 335.3 | 84.0 | 99.2 | 3e-4 |
| 9.79e-5 | 1.7e-4 | 7.8e-7 | 786.5 | 49.8 | 99.2 | 1e-3 |
| 9.89e-5 | 2.0e-4 | 8.8e-7 | 607.4 | 58.0 | 99.1 | 1e-3 |
| 9.57e-5 | 2.1e-4 | 8.8e-7 | 523.7 | 63.9 | 99.1 | 1e-3 |
| 9.33e-5 | 2.3e-4 | 1.0e-6 | 459.2 | 69.5 | 98.9 | 1e-3 |
| 9.60e-5 | 2.7e-4 | 1.2e-6 | 387.8 | 77.7 | 98.8 | 1e-3 |
| 9.71e-5 | 2.9e-4 | 1.3e-6 | 350.6 | 84.1 | 98.7 | 1e-3 |

REMOVAL OF HEXACYANOFERRATES

Hexacyanoferrate anions can also be removed from water by this method. The method for removing hexacyanoferrate (II) ($Fe(CN)_6^{4-}$) and hexacyanoferrate (III) ($Fe(CN)_6^{3-}$) is generally the same as that illustrated in FIG. 1 for the removal of chromate. Removal of these anions can be accomplished using the apparatus 40 shown in FIG. 2.

However when the hexacyanoferrate (II) constitutes the target anion, the regeneration agent from the regeneration agent source 28 (FIG. 1), consists preferably of Cu(II), Zn(II) or Ni(II). In the apparatus 40 (FIG. 2), easily dissociated compounds containing one or more of these cations are placed in the reservoir 78. The cations combine with the hexacyanoferrate (II) to form precipitates. For example, Cu (II) combines with $Fe(CN)_6^{4-}$ to form $Cu_2[Fe(CN)_6]$, which has a solubility constant of about 1.3×10–16.

When hexacyanoferrate (III) is the target anion, the regeneration agent consists of ferric iron. Ferric iron combines with $Fe(CN)_6^{3-}$ to form a precipitate, $Fe_3[Fe(CN)_6]_4$. This precipitate has a solubility constant of about 3.3×10–41.

Changes may be made in the steps or in the sequence of steps of the methods described herein without departing from the spirit and scope of the invention as defined in the following claims.

What is claimed is:

1. A method for removing anions from water, comprising the steps of:

mixing an aqueous stream containing target anions with a cationic complexing agent forming a treated aqueous stream, the cationic complexing agent forming a retention complex with at least a portion of the target anions contained in the aqueous stream;

filtering the retention complex from the treated aqueous stream forming a purified aqueous stream and a retentate comprising the retention complex;

mixing a regeneration agent with the retentate forming a treated retentate comprising regenerated cationic complexing agent and a target anion precipitate and wherein at least a portion of the regeneration agent forms the target anion precipitate with the target anion;

filtering the target anion precipitate from the treated retentate forming a regenerated cationic complexing agent stream; and combining at least a portion of the regenerated cationic complexing agent stream with the aqueous stream.

2. The method of claim 1 wherein the step of filtering the retention complex from the treated aqueous stream further comprises passing the treated aqueous stream through an ultrafilter.

3. The method of claim 1 wherein the target anions comprise anionic chromium compounds.

4. The method of claim 3 wherein the target anions comprise chromate.

5. The method of claim 1 wherein the target anions comprise anionic compounds of arsenic.

6. The method of claim 5 wherein the target anions comprise arsenate.

7. The method of claim 6 wherein the regeneration agent is selected from a group consisting essentially of aluminum salt, ferric iron salt, barium chloride and lead chloride.

8. The method of claim 1 wherein the target anions comprise anionic compounds of sulfer.

9. The method of claim 8 wherein the target anions comprise sulfate.

10. The method of claim 1 wherein the target anions comprise hexacyanoferrates.

11. The method of claim 10 wherein the target anions comprise hexacyanoferrate (II).

12. The method of claim 11 wherein the regeneration agent is selected from a group consisting essentially of Cu(II), Zn(II) and Ni(II).

13. The method of claim 10 wherein the target anions comprise hexacyanoferrate (III).

14. The method of claim 13 wherein the regeneration agent comprises essentially of ferric iron.

15. The method of claim 1 wherein the regeneration agent is selected from a group consisting essentially of barium chloride and lead chloride.

16. The method of claim 1 wherein the cationic complexing agent further consists essentially of a cationic polyelectrolyte.

17. The method of claim 16 wherein the cationic polyelectrolyte additionally consists essentially of polydimethyldiallylammonium chloride.

18. A method for removing anions from water, comprising the steps of:

mixing an aqueous stream containing target anions with a cationic complexing agent forming a treated aqueous stream, the cationic complexing agent forming a retention complex with at least a portion of the target anions contained in the aqueous stream;

filtering the retention complex from the treated aqueous stream forming a purified aqueous stream and a retentate comprising the retention complex;

mixing a regeneration agent with the retentate forming a treated retentate comprising regenerated cationic complexing agent and a target anion precipitate and wherein at least a portion of the regeneration agent forms the target anion precipitate with the target anion;

filtering the target anion precipitate from the treated retentate forming a regenerated cationic complexing agent stream having regenerated cationic complexing agent and regeneration agent therein; and combining at least a portion of the regenerated cationic complexing agent stream with the aqueous stream.

19. The method of claim 18 wherein the target anions comprise anionic chromium compounds.

20. The method of claim 19 wherein the target anions comprise chromate.

21. The method of claim 18 wherein the target anions comprise anionic compounds of arsenic.

22. The method of claim 21 wherein the target anions comprise arsenate.

23. The method of claim 22 wherein the regeneration agent is selected from a group consisting essentially of aluminum salt, ferric iron salt, barium chloride and lead chloride.

24. The method of claim 18 wherein the target anions comprise anionic compounds of sulfer.

25. The method of claim 18 wherein the target anions comprise hexacyanoferrates.

26. The method of claim 25 wherein the target anions comprise hexacyanoferrate (II).

27. The method of claim 26 wherein in the step of providing the regeneration agent the regeneration agent is selected from a group consisting of Cu(III), Zn(II), and Ni(II).

28. The method of claim 25 wherein the target anions comprise hexacyanoferrate (III).

29. The method of claim 28 wherein the regeneration agent consists essentially of ferric iron.

30. The method of claim 18 wherein the regeneration agent is selected from a group consisting essentially of barium chloride and lead chloride.

31. The method of claim 18 wherein in the step of providing the aqueous source, the aqueous source further comprises sulfate anion and wherein at least a portion of the sulfate anion is reacted with regeneration agent in the cationic complexing agent stream to form a sulfate precipitate.

32. The method of claim 18 wherein in the step of providing a cationic complexing agent, the cationic complexing agent comprises a cationic polyelectrolyte.

33. The method of claim 27 wherein the cationic polyelectrolyte comprises polydimethyldiallyammonium chloride.

34. A method for removing anions from water, comprising the steps of:

mixing an aqueous stream containing target anions with a cationic complexing agent forming a treated aqueous stream, the cationic complexing agent forming a retention complex with at least a portion of the target anions contained in the aqueous stream;

filtering the retention complex from the treated aqueous stream forming a purified aqueous stream and a retentate comprising the retention complex;

providing a regeneration agent comprising a metal;

mixing the retentate with the regeneration agent to form a treated retentate wherein the retention complex is caused by the regeneration agent to separate into regenerated cationic complexing agent and target anion, and wherein at least a portion of the target anion forms a target anion precipitate;

filtering the target anion precipitate from the treated retentate forming a regenerated cationic complexing agent stream; and combining at least a portion of the regenerated cationic complexing agent stream with the aqueous stream.

35. The method of claim 34 wherein the step of providing an aqueous source the target anion is an anionic compound of chromium.

36. The method of claim 34 wherein the step of providing the aqueous source the target anion is an anion of chromate.

37. The method of claim 34 comprising the additional step of treating the aqueous stream with a precipitation agent for precipitating sulfate present in the aqueous stream.

38. The method of claim 34 wherein the regeneration agent is selected from a group consisting essentially of iron, zinc, and aluminum.

39. The method of claim 34 wherein the step of mixing the regeneration agent and the retentate further comprises adding a base for enhancing precipitation of the target anion.

40. The method of claim 34 wherein in the step of providing a cationic complexing agent, the cationic complexing agent comprises a cationic polyelectrolyte.

41. The method of claim 40 wherein the cationic polyelectrolyte comprises polydimethyldiallyammonium chloride.

* * * * *

UNITED STATES PATENT AND TRADEMARK OFFICE
CERTIFICATE OF CORRECTION

PATENT NO. : 5,456,840
DATED : October 10, 1995
INVENTOR(S) : Tucker et al.

It is certified that error appears in the above-indentified patent and that said Letters Patent is hereby corrected as shown below:

Column 3, line 8, please delete "regeneration agent stream 26" and substitute therefor -- regeneration agent stream 30 --.

Column 3, line 60, please delete "polymer 50" and substitute therefor -- polymer 52 --.

Column 4, line 34, please delete "second metering pump 100" and substitute therefor -- third metering pump 100 --.

Column 4, line 38, please delete "second metering pump 100" and substitute therefor -- third metering pump 100 --.

Column 4, lines 49-50, please delete the paragraph separation between "optimum" and "reactive".

UNITED STATES PATENT AND TRADEMARK OFFICE
CERTIFICATE OF CORRECTION

PATENT NO.   : 5,456,840
DATED        : October 10, 1995
INVENTOR(S)  : Tucker et al.

It is certified that error appears in the above-indentified patent and that said Letters Patent is hereby corrected as shown below:

Column 7, line 7, please delete "show" and substitute therefor -- shows --.

Column 10, line 37, please delete "claim 27" and substitute therefor -- claim 32 --.

Column 10, line 63, after "wherein" please insert -- in --.

Column 10, line 66, after "wherein" please insert -- in --.

Signed and Sealed this

Twenty-third Day of January, 1996

Attest:

BRUCE LEHMAN

*Attesting Officer*   *Commissioner of Patents and Trademarks*